(12) United States Patent
Draxelmayr

(10) Patent No.: US 6,943,593 B2
(45) Date of Patent: Sep. 13, 2005

(54) SAMPLE-AND-HOLD DEVICE AND METHOD FOR THE OPERATION OF A SAMPLE-AND-HOLD DEVICE

(75) Inventor: Dieter Draxelmayr, Villach (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/434,746

(22) Filed: May 8, 2003

(65) Prior Publication Data

US 2004/0017225 A1 Jan. 29, 2004

(30) Foreign Application Priority Data

May 8, 2002 (DE) .......................... 102 20 577

(51) Int. Cl.$^7$ ............................................... H03K 5/00
(52) U.S. Cl. ............................................. 327/91; 93/94
(58) Field of Search ............................ 327/91, 93, 94, 327/96

(56) References Cited

U.S. PATENT DOCUMENTS 6,021,056 A * 2/2000 Forbes et al. ................. 363/60
6,052,000 A * 4/2000 Nagaraj ......................... 327/94
6,642,751 B1 * 11/2003 Quinn ............................ 327/94

* cited by examiner

Primary Examiner—Timothy P. Callahan
Assistant Examiner—Hiep Nguyen
(74) Attorney, Agent, or Firm—Peter F. Corless; Steven M. Jensen; Edwards & Angell, LLP

(57) ABSTRACT

In the case of a sample-and-hold device a holding condenser is fed with an input voltage via a controllable sampling switch. To improve the transient characteristic of the sampling switch this is fed with an adjusting signal of a controller, which regulates the conductance of a mirror switch with essentially identical features as the sampling switch to an ideal value, whereby the mirror switch is exposed to the same operating conditions as the sampling switch. In order to reduce distortions of the sample-and-hold device, a voltage step-up condenser can be looped into the activating path, which feeds the adjusting signal to the control inputs of the sampling switch or the mirror switch, before which was previously loaded with an auxiliary voltage.

8 Claims, 2 Drawing Sheets

SAMPLE-AND-HOLD DEVICE AND METHOD FOR THE OPERATION OF A SAMPLE-AND-HOLD DEVICE

DESCRIPTION

Figure 1:
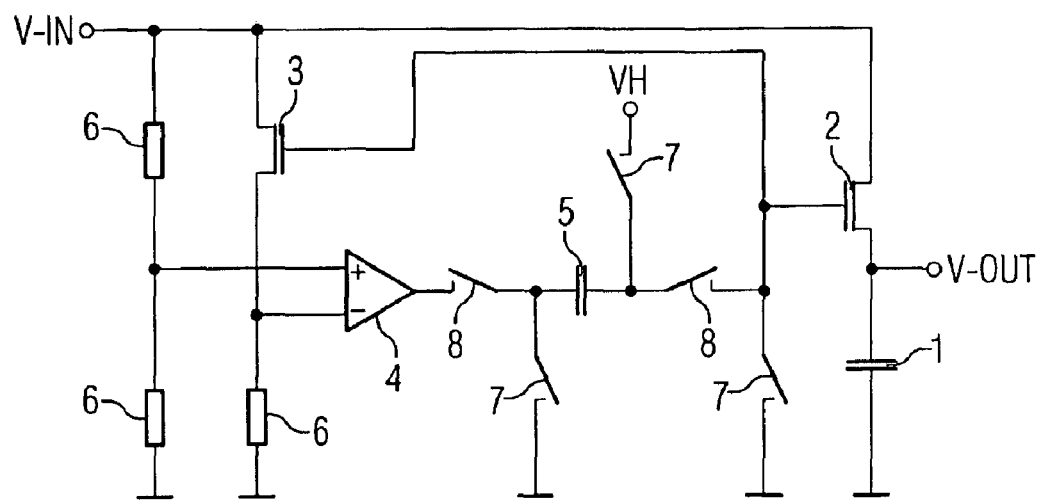

The present invention relates to a sample-and-hold device for an electrical input voltage signal with a holding condenser, a controllable sampling switch, with which the holding condenser can be fed with the input voltage, and a regulating device, which identifies the conductance of a mirror switch with at least essentially identical electrical features as the sampling switch and which can be adjusted to a desired value, whereby the mirror switch and the sampling switch are activated in parallel. If similar behaviour of the sampling switch and the mirror switch is assumed, regulation of the conductance of the sampling switch is achieved as a result.

Sample-and-hold devices generally serve to convert a time-constant voltage into a time-discrete voltage. For this purpose, the holding condenser is selectively fed with the time-constant voltage whereby to keep the voltage at a certain time-point the connection between the input voltage and the holding condenser is interrupted or the sampling switch is closed. During the sampling operation, best possible electrical connection between the input voltage and the holding condenser is sought, so that the voltage applied on the holding condenser can follow the input voltage with as little delay as possible. Since the sampling switch is switched between the variable input voltage and the holding condenser, the voltage of which is also variable, the sampling switch does not function under constant operating conditions and in particular with fluctuating voltage ranges, so that disadvantageously distortions arise when the time-constant input voltage is converted into the time-discrete output voltage which is applied on the holding condenser.

To prevent this distortion, it is known from "A 64 MHz SD-ADC with 105 dB IM3 Distortion using A Linearized Replica Network; IEEE International Solid State Circuits Conference" to introduce an additional mirror switch, which essentially has the same electrical features as the sampling switch, and to feed this mirror switch at one end of the control path with the input voltage, so that this is exposed to essentially identical voltage conditions. In this case, the conductance of the mirror switch is identified by means of a measuring bridge and regulated to an ideal value by activating a control input of the mirror switch. The control input of the mirror switch is connected to the control input of the sampling switch, so that this is activated in parallel and when the two are synchronized, regulation of the conductance of the sampling switch is also achieved as a result.

A sample-and-hold device of this kind, however, has numerous disadvantages. On the one hand, an offset of the regulating device, which is normally present, has a disadvantageous effect on the regulation of the conductance of the two switches, so that distortion of the output voltage increases. In addition, the output voltage range of the regulating device is limited, so that only limited voltage is available to activate the switches. In particular with high input voltages this means that only very little voltage is available to activate the two switches, so that these can no longer be fully controlled as required and either the distortions increase and/or the useful voltage range is reduced.

The underlying object of the present invention is to create a sample-and-hold device or a method for the operation of a sample-and-hold device with which minimum distortion can be obtained when a time-constant voltage is converted into a time-discrete voltage.

According to the invention, this object is achieved by a sample-and-hold device with the features of claim 1 as well as a method with the features of claim 22 respectively.

By using a voltage step-up condenser, the regulating device is able to activate the two switches with a higher voltage, without a higher voltage having to be provided within the circuit. The operating voltage of the sample-and-hold device can remain the same, so that without additional expenditure for changing the current supply, distortions due to an insufficient adjusting range for regulating the controlled sampling switch can be prevented or at least reduced. To provide the additional activating voltage by means of the voltage step-up condenser, this must be fed during certain operating phases with the auxiliary voltage. This occurs advantageously if the sample-and-hold device is in the holding phase, during which the sampling switch is not fully controlled in any case. In order to feed the voltage step-up condenser with the auxiliary voltage this is disconnected from the voltage path by means of switches between the regulating device and the two switches and connected by means of further switches to the auxiliary voltage.

Advantageously, all the switches can be activated by means of a single control signal, as a result of which the sampling operation is changed over to the holding operation. During the sampling operation, the voltage step-up condenser is disconnected from the auxiliary voltage and is looped into the voltage path between the regulating device and the two switches, whereas during the holding operation the voltage step-up condenser is disconnected from the path between the regulating device and the two switches and is fed with an auxiliary voltage, whereby to close the sampling switch at the same time its control input is fed with a voltage closing the sampling switch. In the case of a NMOS field-effect transistor or an npn transistor, its control input would be connected to earth during the holding phase.

In addition, distortions of the voltage to be sampled are prevented or at least reduced by the compensation of an offset voltage of the regulating device. The offset compensation takes place with a compensation condenser, which during normal operation, in which the regulating device regulates the conductance of the mirror switch or the sampling switch, is looped into a voltage path leading to an input of the regulating device. To compensate the offset voltage of the regulating device, the compensation condenser must have been loaded beforehand with a balancing voltage. The balancing voltage depending on the amount advantageously corresponds to the offset voltage of the regulating device and possesses the reverse polarity sign, so that the voltage on the compensation condenser as well as the offset voltage of the regulating device connected in series results in zero.

Advantageously, a differential amplifier or an operational amplifier with an inverting input and a non-inverting input is used as regulating device. If in the case of a regulating device of this kind, the inverting input is connected during the learning mode to the output, and the non-inverting input is adjusted to a defined voltage level, the offset voltage is applied between the non-inverting input and the output, so that the compensation condenser must only be connected between the non-inverting input and the inverting input or the output, in order to feed or load it with the balancing voltage. The non-inverting input of the regulating device at the same time can remain connected as is the case during normal operation. Advantageously, the compensation condenser is loaded with the balancing voltage during the holding phase of the sample-and-hold device. Therefore, the switches can also be activated to feed the compensation condenser with the balancing voltage or to make the connection necessary for the normal operation of the regulating device with the compensation condenser looped in depending on the control signal, as a result of which the sampling operation and holding operation are changed over. The compensation condenser in this case is fed with the balancing voltage during the holding operation, in which the conductance of the two switches is not regulated, whereby the regulating device must be connected accordingly.

Advantageously, the conductance of the mirror switch can be identified with a measuring bridge, in which a series connection consisting of two linear resistors and a second series connection consisting of the mirror switch and a linear resistor are fed with the same voltage and the diagonal voltage applied on the junctions of the two series connections is identified by the regulating device. For this purpose, the junctions of the two series connections can be connected to an inverting or a non-inverting input of the regulating circuit, which in particular is an operational amplifier. Advantageously, the resistance bridge is fed with the input voltage, whereby the mirror switch at one end of its path to be controlled is directly fed with the input voltage, so that a comparable operation to the sampling switch results.

The invention is described in detail below on the basis of preferred exemplary embodiments with reference to the attached drawings.

Figure 2:
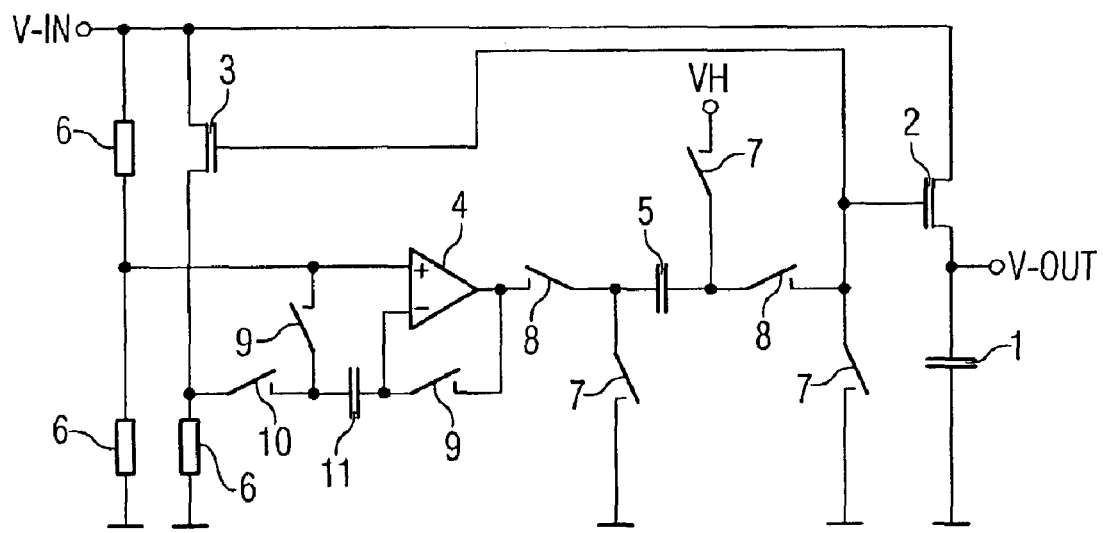
Figure 3:
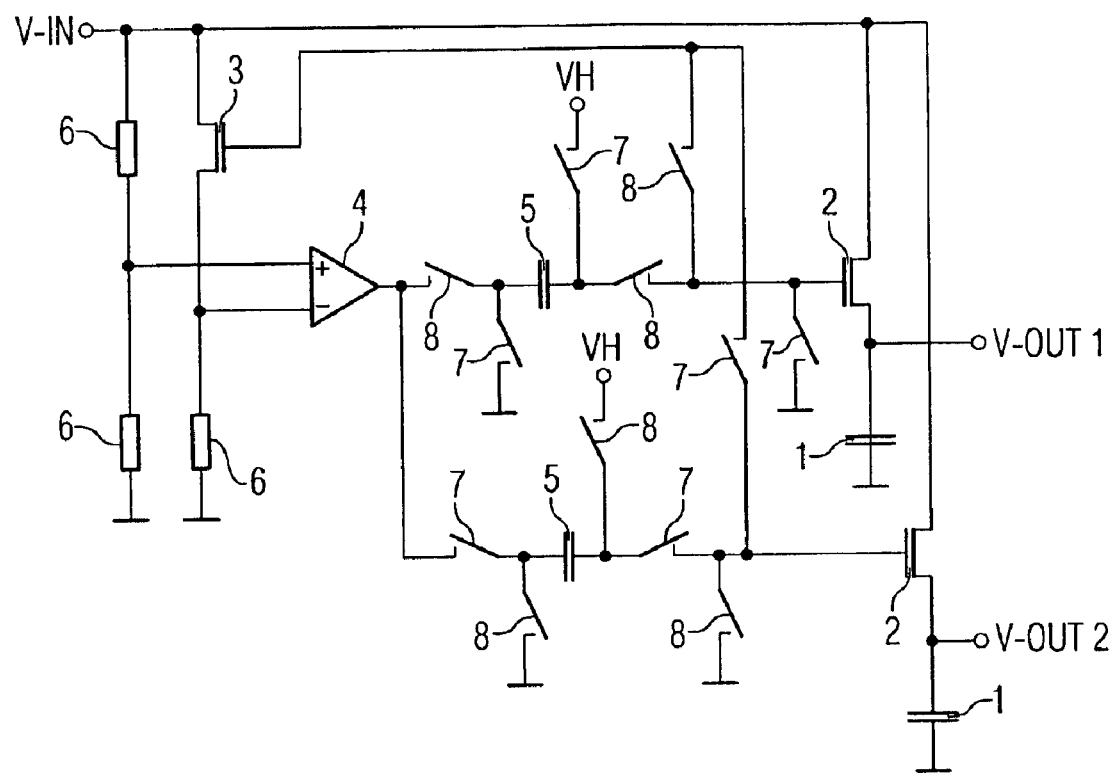

FIG. 1 shows the structure of a sample-and-hold device in accordance with a first exemplary embodiment of the present invention, FIG. 2 shows the structure of a sample-and-hold device in accordance with a second exemplary embodiment of the present invention, and FIG. 3 shows the structure of a sample-and-hold device in accordance with a third exemplary embodiment of the present invention.

In FIG. 1, a sample-and-hold device is represented in accordance with a first exemplary embodiment of the present invention. The sample-and-hold device illustrated serves to convert a time-constant input voltage V-IN into a time-discrete output voltage V-OUT. For this purpose, a holding condenser 1, on which the output voltage V-OUT is applied, is fed with the input voltage V-IN via a field-effect transistor as sampling switch 2. During a sampling operation, the sampling switch 2 is fully controlled and thus closed, so that the voltage lying on the holding condenser 1 follows the input voltage V-IN, whereas during a holding operation the sampling switch 2 is blocked and thus opened, so that the voltage last adjusted with the conductive sampling switch 2 applied on the holding condenser 1, remains constant. Due to the never to be neglected conductance of the sampling switch 2 during the sampling phase, disadvantageously distortions of the output voltage V-OUT can arise nevertheless. These are caused in particular by irregular conductance of the sampling switch 2 in the fully controlled state. Since the sampling switch 2 with its path to be controlled lies between input voltage and output voltage, both of which can vary greatly, the sampling switch 2 finds itself in fluctuating voltage ranges. Since the conductance of the sampling switch 2 is determined by a voltage difference between a control input of the sampling switch 2 and the voltage applied at one end of the path to be controlled, with constant voltage on the control input of the sampling switch 2 and fluctuating input voltage V-IN, fluctuation of the conductance of the sampling switch 2 and therefore a distortion of the output voltage V-OUT would result.

In order to prevent this, a device is assigned to the sampling switch 2 to regulate its conductance during the sampling operation. This device consists of an operational amplifier 4 together with a resistance bridge 6 with a mirror switch 3. The mirror switch 3 at least essentially has the same electrical features as the sampling switch 2, whereby in particular its conductance corresponds to the conductance of the sampling switch 2 with identical activation. By scaling the transistor sizes of the sampling switch 2 and the mirror switch 3 arbitrary resistance conditions can also be prevented. The mirror switch 3 is connected together with three linear resistors 6 to a measuring bridge, which is fed at the upper end with the input voltage signal V-IN and is connected at the lower end to earth. The mirror switch 3 is arranged in such a way that it is fed at one end of the path to be controlled directly with the input voltage V-IN.

The junctions of the two series connections forming the bridge are connected to the non-inverting or the inverting input of the operational amplifier 4, whereby the junction between the two linear resistors of the series connection shown on the left of the bridge circuit is connected to the non-inverting input and the junction between the third resistor 6 and the mirror switch 3 is connected to the inverting input of the operational amplifier 4. The output of the operational amplifier 4 can be connected by second switches 8 or switches of a second switch group and a voltage step-up condenser 5 to the control inputs of the sampling switch and the mirror switch 3. In this case, the operational amplifier 4 via the voltage step-up condenser 5 regulates the control inputs of the sampling switch 2 and in particular the mirror switch 3 in such a way that the diagonal voltage of the resistance bridge becomes zero. This means that the conductance of the mirror switch 3 behaves like a linear resistor. Since the sampling switch 2 is activated parallel with this and is equally fed with the input voltage signal V-IN at its upper end of the control path, the same value for the conductance of the sampling switch 2 is set as for the mirror switch 3, provided its electrical behaviour corresponds to that of the mirror switch 3.

The voltage step-up condenser 5 can be fed with an auxiliary voltage when the second switches 8 are open by means of first switches 7 or switches of a first switch group 7. In the exemplary embodiment illustrated for this purpose with the first switches 7 one terminal of the voltage step-up condenser 5 is connected to earth and the other to an auxiliary voltage $V_H$. As soon as the first switches 7 on the voltage step-up condenser 5 are again opened and the second switches 8 are closed, the output voltage of the operational amplifier 4 increased by the auxiliary voltage $V_H$ is applied on the control inputs of the sampling switch 2 or the mirror switch 3.

In this way, the sampling switch 2 and the mirror switch 3 can be activated with a substantially higher voltage, than would otherwise be possible if the operating voltage of the sample-and-hold device and in particular the operational amplifier 4 were used. Advantageously, this results in a higher dynamic range for the input voltage V-IN and less distortion of the output voltage V-OUT, since a higher voltage is available to regulate the conductance of the sampling switch 2 or the mirror switch 3. Together with the first switches 7 on the voltage step-up condenser 5, a further first switch 7 between the control input of the sampling switch 2 and earth is closed, so that the switch 2 closes. In the present exemplary embodiment, the first switches 7 are closed during the holding phase and the second switches 8 are closed during the sampling phase.

FIG. 2 shows a second exemplary embodiment of the present invention, with which the transient characteristic of the sample-and-hold device is additionally improved by offset compensation of the operational amplifier 4. For this purpose, the sample-and-hold device in accordance with the second embodiment, additionally to the sample-and-hold device in accordance with the first embodiment, has two third switches 9 or switches of a third switch group 9, a fourth switch 10 and a compensation condenser 11. With the aid of the third switches 9 and the fourth switch 10, the compensation condenser 11 can be loaded with a correction voltage, with which an offset voltage of the operational amplifier 4 can be compensated, if the compensation condenser 11 is looped into a voltage path leading to an input of the operational amplifier 4. In this case, the compensation condenser 11 lies in series with an offset voltage assigned to an input of the operational amplifier 4, so that this can be fully compensated.

For this purpose, the output of the operational amplifier 4 with the inverting input can be connected to a third switch 9. The compensation condenser 11 is connected at one end to the inverting input of the operational amplifier 4 and at the other end to the second third switch 9 and the fourth switch 10, which form a change over switch. With the aid of the second third switch 9 and the fourth switch 10, the other connection of the compensation condenser 11 can either be connected to the non-inverting input of the operational amplifier 4, or to the junction of a series connection of the resistance bridge.

In order now to load the compensation condenser 11 with the balancing voltage, the third switches 9 are closed and the fourth switch 10 is opened. In this circuit, the operational amplifier 4 forms a voltage follower, the voltage input of which is the non-inverting input of the operational amplifier and is applied in a defined voltage. A possibly existing offset voltage of the operational amplifier 4 is applied in this circuit between its two inputs and therefore also on the compensation condenser 11, so that this is loaded with a balancing voltage, which corresponds to the offset voltage of the operational amplifier 4.

During normal operation, the third switches 9 are open and the fourth switch 10 is closed. In this circuit, the operational amplifier 4 is wired as differential amplifier fed with the diagonal voltage of the resistance bridge 6, 3 and as described above, regulates the conductance of the mirror switch 3. Additionally however, the compensation condenser 11 is looped into the voltage path, which leads to the inverting input of the operational amplifier 4, so that a series connection between the balancing voltage at the compensation condenser 11 and a possibly existing offset voltage of the operational amplifier 4 is achieved. Due to the reverse polarity of the balancing voltage on the compensation condenser 11, this leads to compensation of the offset voltage of the operational amplifier 4.

The third switches 9 are activated synchronously with the first switches 7 and the fourth switch 10 synchronously with the second switches 8, so that the compensation condenser 11 is loaded during the holding phase or during the holding operation of the sample-and-hold device with the balancing voltage.

In FIG. 3, a third exemplary embodiment of the present invention is described, which corresponds to the first exemplary embodiment, whereby in addition there is a second holding condenser 1 with a second sampling switch 2, whereby a first or a second output voltage V-OUT 1, V-OUT 2 is applied on the two holding condensers 1. The first or second switches 7, 8 are expanded in this exemplary embodiment in such a way that the operational amplifier 4 can activate the two sampling switches 2 alternately. In this case, the switches 7, 8 are equipped or activated in such a way that, if the upper sampling switch 2 is activated by the operational amplifier 4 the voltage step-up condenser 5 is fed with the auxiliary voltage $V_H$ assigned to the lower sampling switch 2 and vice versa.

This leads to the fact that the two sampling switches 2 are always alternately closed or open. Advantageously, in this exemplary embodiment the control input of the mirror switch 3 is constantly fed by the output of the operational amplifier 4. The control loop wound around the operational amplifier 4 is never open, whereby the connection between the output of the operational amplifier 4 and the control input of the mirror transistor 3 is only made between two paths in each case with a voltage step-up condenser 5. In this way, it is possible to prevent the output of the operational amplifier 4 reaching saturation due to any interruption in the control loop. Therefore, after switching over the first and second switches 7, 8 the transient effect of the regulation is substantially accelerated. With the third embodiment of the present invention shown in FIG. 3 therefore an advantage can also be achieved if only one output voltage V-OUT 1 is required.

What is claimed is:

1. Sample-and-hold device for an electrical input voltage signal (V-IN) with a holding condenser (1), a controllable sampling switch (2), which is connected between an input fed with the input voltage signal (V-IN) and a connection of the holding condenser (1), a controllable mirror switch (3) and a regulating device (4), which has a controllable output and is equipped in such a way that it identifies the conductance of the mirror switch (3) and by activating a control input of the mirror switch (3) regulates it to an ideal value, whereby the control input of the mirror switch (3) is connected to a control input of the sampling switch (2), so that the mirror switch (3) and the sampling switch (2) are activated in parallel by the regulating device (4), characterized in that the sample-and-hold device has a switch arrangement (7, 8) and a voltage step-up condenser (5) and the switch arrangement (7, 8) is equipped in such a way that by means of the switch arrangement (7, 8) the voltage step-up condenser (5) is fed either with an auxiliary voltage or is connected between the controllable output of the regulating device (4) and the control inputs of the sampling switch (2) and the mirror switch (3).

2. Sample-and-hold device according to claim 1, characterized in that the sample-and-hold device has a resistance bridge (3, 6), in which three resistors (3) and the mirror switch (3) are connected to a bridge, whereby the regulating device (4) is fed with a diagonal voltage of the resistance bridge (3, 6).

3. Sample-and-hold device according to claim 1, characterized in that the mirror switch (3) at one end of the connected path is fed with the input voltage signal (V-IN).

4. Sample-and-hold device according to claim 1, characterized in that the regulating device (4) is an operational amplifier.

5. Sample-and-hold device according to claim 1, characterized in that the sampling switch (2) and the mirror switch (3) are field-effect transistors.

6. Sample-and-hold device according to claim 1, characterized in that the sample-and-hold device has a switch, with which the control input of the sampling switch (2) is connected to a voltage closing the sampling switch (2) if the switch is closed.

7. Method for the operation of a sample-and-hold device for an electrical input voltage signal (V-IN) with a holding condenser (1), a controllable sampling switch (2), which is connected between an input fed with the input voltage signal (V-IN) and a connection of the holding condenser (1), a controllable mirror switch (3) and a regulating device (4), with which method the conductance of the mirror switch (3) is identified by means of the regulating device and is regulated to an ideal value by activating a control input of the mirror switch (3), whereby the control input of the mirror switch (3) is connected to a control input of the sampling switch (2), so that the mirror switch (3) and the sampling switch (2) are activated in parallel by the regulating device (4), characterized in that during normal operation to activate the sampling switch (2) and the mirror switch (3) a voltage step-up condenser (5) is connected between the output of the regulating device (4) and the control inputs of the sampling switch (2) and the mirror switch (3) and in a voltage step-up operation the voltage step-up condenser (5) is fed with an auxiliary voltage.

8. Method according to claim 7, characterized in that outside normal operation the sampling switch (2) is opened.

* * * * *